United States Patent
Zhang et al.

(10) Patent No.: US 11,762,444 B2
(45) Date of Patent: Sep. 19, 2023

(54) LOAD LINE COMPENSATION IN POWER MONITORING

(71) Applicant: Oracle International Corporation, Redwood Shores, CA (US)

(72) Inventors: Lin Zhang, San Jose, CA (US); Yifan YangGong, Milpitas, CA (US); Sebastian Turullols, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 42 days.

(21) Appl. No.: 17/388,830

(22) Filed: Jul. 29, 2021

(65) Prior Publication Data

US 2021/0357014 A1  Nov. 18, 2021

Related U.S. Application Data

(63) Continuation of application No. 15/965,963, filed on Apr. 29, 2018, now Pat. No. 11,086,377.

(51) Int. Cl.
 *G06F 1/28* (2006.01)
 *G06F 1/08* (2006.01)

(52) U.S. Cl.
 CPC . *G06F 1/28* (2013.01); *G06F 1/08* (2013.01)

(58) Field of Classification Search
 CPC ..................................... G06F 1/28; G06F 1/08
 See application file for complete search history.

(56) References Cited

U.S. PATENT DOCUMENTS

| 8,929,169 B1* | 1/2015 | Yang ..................... G11C 5/147 |
| | | 713/320 |
| 9,021,276 B2 | 4/2015 | Osborn et al. |
| 2003/0083037 A1* | 5/2003 | Yajima ............... G06K 19/0701 |
| | | 455/343.1 |
| 2007/0005152 A1 | 1/2007 | Karr et al. |
| 2008/0122412 A1 | 5/2008 | Burton et al. |

(Continued)

FOREIGN PATENT DOCUMENTS

| CN | 1607483 A | 4/2005 |
| CN | 103151924 A | 6/2013 |

(Continued)

OTHER PUBLICATIONS

Office Action in Chinese Appl. No. 201910354442.9 dated Dec. 20, 2021, 5 pages.

(Continued)

*Primary Examiner* — Zahid Choudhury
(74) *Attorney, Agent, or Firm* — Kowert, Hood, Munyon, Rankin & Goetzel, P.C.; Dean M. Munyon

(57) ABSTRACT

A method for determining power dissipation within a computer system is disclosed. A circuit block may receive a regulated voltage level on a power supply signal generated by a voltage regulator circuit. A power control circuit may measure a current drawn by the circuit block, and determine a real-time voltage level for the power supply signal using the current and based on a slope value and a zero-load voltage level. Additionally, power control circuit may determine a power dissipation for the circuit block using the current and the real-time voltage level, and adjust an operation parameter of the circuit block based on the power dissipation.

17 Claims, 7 Drawing Sheets

(56) References Cited

U.S. PATENT DOCUMENTS

| | | |
|---|---|---|
| 2009/0327776 A1 | 12/2009 | Nguyen |
| 2013/0024713 A1 | 1/2013 | Bajic et al. |
| 2013/0297950 A1 | 11/2013 | Osborn et al. |
| 2013/0313903 A1* | 11/2013 | Kayama .................. G06F 1/263 |
| | | 307/26 |
| 2014/0101463 A1* | 4/2014 | Ju ............................ G06F 1/26 |
| | | 713/300 |
| 2014/0173310 A1* | 6/2014 | Tsuji ..................... G06F 1/3206 |
| | | 713/320 |
| 2015/0346798 A1 | 12/2015 | Dongara et al. |
| 2016/0041207 A1 | 2/2016 | Cheng et al. |
| 2016/0109932 A1* | 4/2016 | Jeon ..................... G06F 1/3296 |
| | | 713/323 |
| 2016/0349692 A1* | 12/2016 | Tomimatsu ........ H04N 1/00899 |
| 2017/0255251 A1 | 9/2017 | Zhang et al. |
| 2018/0101207 A1* | 4/2018 | Bharath ................ H01L 23/645 |
| 2020/0089296 A1* | 3/2020 | Fossati .................... G06F 1/263 |
| 2021/0036876 A1* | 2/2021 | Ku .......................... H04L 12/10 |

FOREIGN PATENT DOCUMENTS

| | | |
|---|---|---|
| CN | 105027407 A | 11/2015 |
| CN | 105612471 A | 5/2016 |
| CN | 105765957 A | 7/2016 |

OTHER PUBLICATIONS

Office Action in TW Appl. No. 108114862 dated Jun. 22, 2022, 5 pages.

* cited by examiner

LOAD LINE COMPENSATION IN POWER MONITORING

PRIORITY CLAIM

The present application is a continuation of U.S. application Ser. No. 15/965,963, filed Apr. 29, 2018 (now U.S. Pat. No. 11,086,377), which is incorporated by reference herein in its entirety.

BACKGROUND

Technical Field

This disclosure relates to power management in integrated circuits, and more particularly to the monitoring and adjustment of voltage levels of power supply signals.

Description of the Related Art

Modern integrated circuits include multiple circuit blocks, each designed to perform particular computing tasks. For example, an integrated circuit may include one or more memory circuits configured to store data, software program instructions, and the like. Alternatively, or additionally, an integrated circuit may include one or more processors or processor cores configured to execute program instructions.

In some integrated circuits, different circuit blocks may operate using different power supply voltage levels. The different circuit blocks may also operate using different clock signals, each of which may have a different frequency. During operation, the voltage levels of power supply signals and the frequencies of clock signals may be modified as part of dynamic voltage and frequency scaling (DVFS).

In addition to different circuit blocks using different power supply voltage levels, a current drawn by a particular circuit block may change over time. For example, a processor circuit executing a particular set of program instructions may draw a different amount of current than when the processor circuit is executing a different set of program instructions. Power management circuits included in the computer system may monitor such variations in current demand and adjust operation of voltage regulation circuits based on the changes in current demand.

SUMMARY OF THE EMBODIMENTS

Various embodiments of a method for monitoring and adjusting a voltage level of a power supply signal in a computer system are disclosed. Broadly speaking, a voltage regulator circuit may be configured to generate a voltage level on a power supply signal, and a power control circuit may be configured to measure a current drawn by a circuit block coupled to the power supply signal. The power control circuit may be further configured to determine a real-time voltage level for the power supply signal using the current and based on a slope value and a zero-load voltage level, and determine a power dissipation for the circuit block using the current and the real-time voltage level. The power control circuit may be further configured to adjust an operation parameter of the circuit block based on the power dissipation.

In another embodiment, to measure the current, the power control circuit may be further configured to measure the current drawn by the circuit block at a plurality of time points to generate a plurality of current values.

In a non-limited embodiment, the power control circuit may be further configured to determine an average current value using the plurality of current values.

Figure 1:
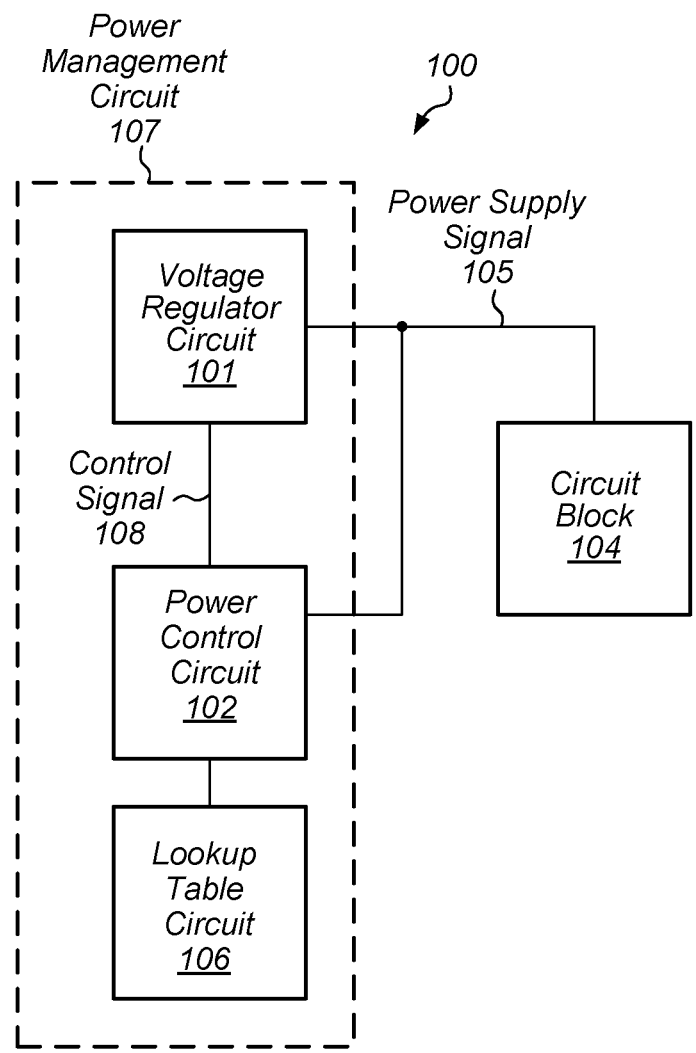
FIG. 1 is a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In a computer system, including a system-on-a-chip (or "SoC"), different circuit blocks within the computer system may use different power supply voltage levels. To provide the various power supply voltage levels used within the computer system, the computer system may include one or more voltage regulator circuits that are configured to generate regulated voltage levels for internal power supply signals using an externally supplied power supply signal.

In some computer systems, a power control circuit may be used to monitor and adjust the operation of a voltage regulator circuit based on operating characteristics of the computer system. Various techniques may be employed by a power control circuit to adjust the operation of a voltage regulator circuit. For example, the output voltage level of the voltage regulator circuit may be regulated relative to the current consumed (or drawn) by circuit blocks coupled to the voltage regulator circuit. This technique is commonly referred to as the "load line technique."

In some computer systems, additional margin may be added to a power limit since the load line technique may introduce extra error estimation into the power calculation. Such additional margin may lower the performance of the computer system, and increase the complexity of the electrical design of the system. The embodiments illustrated in the drawing and described below may provide techniques for monitoring and adjusting a voltage regulator circuit, while improving the accuracy of the power calculation and reducing the need for extra margin.

An embodiment of a computer system is illustrated in the block diagram of FIG. 1. In the illustrated embodiment, computer system 100 includes power management circuit 107 and circuit block 104. Power management circuit 107 includes voltage regulator circuit 101, power control circuit 102, and lookup table circuit 106.

Voltage regulator circuit 101 is configured to generate a voltage level on power supply signal 105. In various embodiments, voltage regulator circuit 101 may be a particular embodiment of a switching regulator circuit configured to selectively couple power supply signal 105 to a source power supply signal (not shown) in order to maintain a particular voltage level on power supply signal 105. Various operation parameters, such as a target voltage level for power supply signal 105, may be adjusted by control signal 108 generated by power control circuit 102. As used and described herein an operation parameter refers a parameter associated with a voltage level of a signal, a frequency of a signal, a mode of operation, or any other aspect of a circuit that affects operation of the circuit.

In some embodiments, voltage regulator circuit 101 may include passive circuit elements, such as inductors, for example. Such passive circuit elements may be included on a common integrated circuit with voltage regulator circuit 101. Alternatively, the passive circuit elements may be external discrete elements coupled to an integrated circuit including voltage regulator circuit 101. Although only a single voltage regulator circuit is depicted in the embodiment of FIG. 1, in other embodiments, multiple voltage regulator circuits configured to generate respective voltage levels on respective power supply signals may be employed.

Circuit block 104 is coupled to power supply signal 105. In various embodiments, circuit block 104 may include any suitable collection of analog or digital circuits configured to perform a desired function or functions using a voltage level of power supply signal 105. For example, in some embodiments, circuit block 104 may include one or more processors or processor cores configured to execute software or program instructions. Alternatively, or additionally, circuit block 104 may include one or more memory circuits configured to store data, or software or program instructions. Although only a single circuit block, i.e., circuit block 104, is depicted in FIG. 1, in other embodiments, any suitable number of circuit blocks may be employed.

Power control circuit 102 is configured to measure a current drawn by circuit block 104. In various embodiments, power control circuit 102 may measure a voltage level of power supply signal 105 and determine the current drawn by circuit block 104 using the measured voltage level of power supply signal 105. Alternatively, power control circuit 102 may use an electromagnetic sensor, or other suitable sensor or circuit, to measure the current drawn by circuit block 104. It is noted that in some cases, power control circuit 102 may be configured to measure the current of an entire domain that includes multiple circuit blocks coupled to a common power supply signal.

Additionally, power control circuit 102 is configured to determine a real-time voltage level for power supply signal 105 using the current and based on a slope value and zero-load voltage level. As used herein, a zero-load voltage level refers to an output voltage level of a voltage regulator circuit in the absence of any load circuit. Using the current and the real-time voltage level, power control circuit 102 is configured to determine a power dissipation for circuit block 104, and adjust an operation parameter of circuit block 104 based on the power dissipation. In some embodiments, the zero-load voltage level is based on a power state of circuit block 104.

In various embodiments, power control circuit 102 may arithmetically combine the zero-load voltage level, the slope value, and the current to generate the real-time voltage level. For example, power control circuit 102 may combine the aforementioned values according to Equation 1. It is noted that the slope may be programmable by firmware during a boot or other startup operations.

$$\text{voltage}_{real\_time} = \text{zero\_load\_voltage} + \text{slope} \times \text{current} \quad (1)$$

Power control circuit 102 may include any suitable combination of analog and digital circuits. In some embodiments, power control circuit 102 may include one or more sequential logic circuits or state machines configured to perform the operations described above. Alternatively, power control circuit 102 may include a general-purpose processor configured to execute software or program instructions, allowing power control circuit 102 to perform the operations described above.

To measure the current drawn by circuit block 104, power control circuit 102 is configured to measure the current drawn by circuit block 104 to generate a plurality of current values. For example, circuit block 104 may sample the current being drawn by circuit block 104 at multiple time points over a particular period of time. Using the plurality of current values, power control circuit 102 may determine an average current value.

Power control circuit 102 may be further configured to determine a leakage current drawn by circuit block 104 using the real-time voltage. As used and described herein, leakage current refers to a current drawn by a circuit when the circuit is under bias but inactive. To determine the leakage current, power control circuit 102 may modify the real-time voltage using an offset voltage level to generate a modified voltage level, and access lookup table circuit 106 using the modified voltage level. The modified voltage level may consist of multiple data bits depending on the particular architecture of the power control circuit. For example, in some cases, the modified voltage level may be represented using 16-bits of data.

Lookup table circuit 106 is configured to store data indicative of leakage current of circuit block 104 at different power supply voltage levels. Such data may be retrieved from lookup table circuit 106 using a power supply voltage. In various embodiments, lookup table circuit 106 may be a particular embodiment of a memory circuit that includes multiple data storage circuits. Such data storage circuits may, in various embodiments, be dynamic, static, or non-volatile data storage circuits. Data may be stored in lookup table circuit 106 during a power-up or boot procedure.

It is noted that the embodiment of a computer system depicted in the block diagram of FIG. 1. In other embodiments, different arrangements of circuit blocks, such as multiple voltage regulator circuit generating multiple power supply signals, may be employed.

Figure 2:
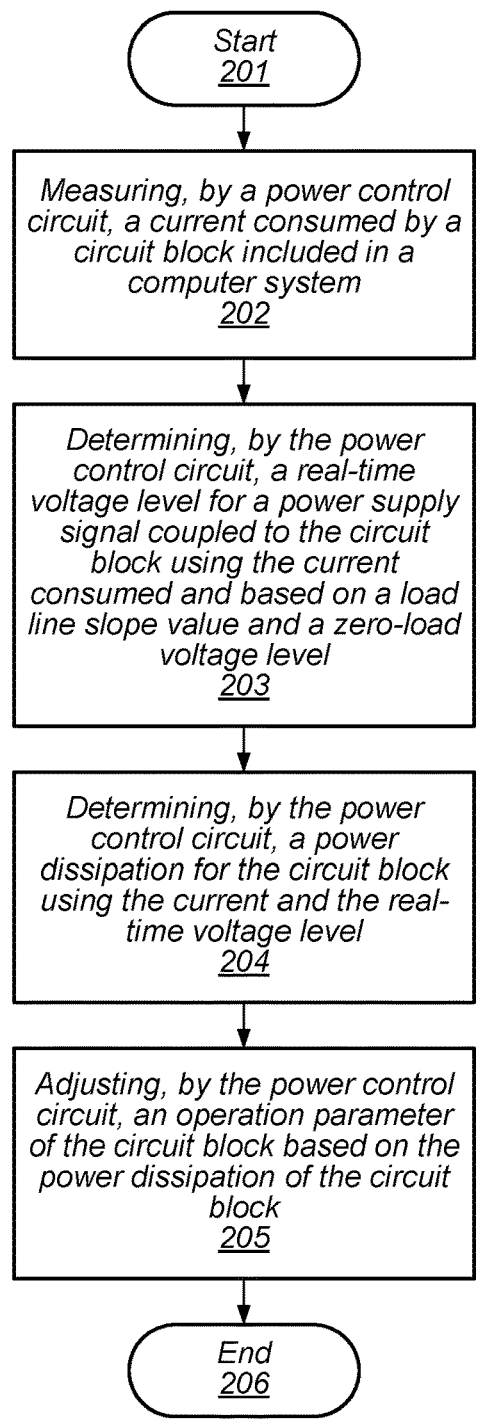
FIG. 2 illustrates a flow diagram depicting an embodiment of a method for determining power consumption of a circuit block in computer system.

An embodiment of a method for determining power consumption of a circuit block in computer system is illustrated in the flow diagram of FIG. 2. The method depicted in the flow diagram of FIG. 2 may be used in conjunction with a computer system, such as computer system 100 as depicted in FIG. 1. The method begins in block 201.

A power control circuit may then measure a current consumed by a circuit block included in a computer system (block 202). In various embodiments, the current may be measure by determining a voltage drop across a known resistance in series with a power supply signal coupled to the circuit block. Alternatively, a sensor configured to detect an electromagnetic field associated with the power supply signal may be employed.

The power control circuit may determine a real-time voltage level for the power supply signal coupled to the circuit block using the current consumed by the circuit block and based on a load line slope value and a zero-load voltage level (block 203). In some embodiments, the power control circuit may perform a series of arithmetic operations using the current, the load line slope value and the zero-load voltage level to determine the real time voltage level. For example, the power control circuit may determine the real-time voltage level in accordance with Equation 1.

A power dissipation for the circuit block may then be determined by the power control circuit using the current and the real-time voltage level (block 204). In various embodiments, the power control circuit may arithmetically combine the current and the real-time voltage level to determine the power dissipation of the circuit block. For example, the power control circuit may multiply the current and real-time voltage level to determine the power dissipation of the circuit block.

The power control circuit may then adjust an operation parameter of the circuit block based on the power dissipation of the circuit block (block 205). In some embodiments, the power control circuit may adjust a power state of the circuit block. For example, the power control circuit may change the power state of the circuit block from its current power state to a power state that employs a lower power supply voltage and/or a lower clock frequency. By adjusting the power state of a circuit block in this fashion, the power dissipation of the computer system may be adjusted based on performance demands and the power dissipation of individual circuit blocks included in the computer system.

Although the operations included in the embodiment of the method illustrated in FIG. 2 are depicted as being performed in a serial fashion, in other embodiments, one or more of the operations may be performed in parallel.

In addition to the power calculation being affected by an inaccurate estimation of the voltage level of a power supply signal, the determination of leakage current for a circuit block or plurality of circuits blocks in the computer system is similarly affected. An embodiment of a method for determining the leakage current of a circuit block or plurality of circuit blocks is illustrated in the flow diagram of FIG. 3. In various embodiments, the embodiment of the method illustrated in the flow diagram of FIG. 3 may be included in block 204 of the flow diagram depicted in FIG. 2. The method begins in block 301.

A real-time voltage level of a power supply signal may then be modified using an offset voltage level by a power control circuit to generate a modified voltage level (block 302). In various embodiments, the offset voltage level may be added to or subtracted from the real-time voltage level to generate the modified voltage level. In some cases, the offset voltage level may be programmed by software, and may be based on a voltage factor for a highest power state for the computer system, as well as possible load line voltage drops.

The power control circuit may then access a lookup table using the modified voltage level to retrieve a leakage current value (block 303). In various embodiments, the lookup table may store numerous leakage current values corresponding to different power states in the computer system. For example, in some cases, the lookup table may include 16 entries and each entry is selectable by either of two different voltage steps. The leakage current values may be determined empirically based on measured data from different transistors or other transconductance devices at different voltage levels.

By generating a modified voltage level to index the lookup table, error in the estimation of leakage current may be reduced, thereby improving the power calculation. Once the leakage current value has been retrieved, it may be used in determining the power consumption of a circuit block or plurality of circuit blocks as described above in regard to FIG. 2. The method may then conclude in block 304.

Figure 3:
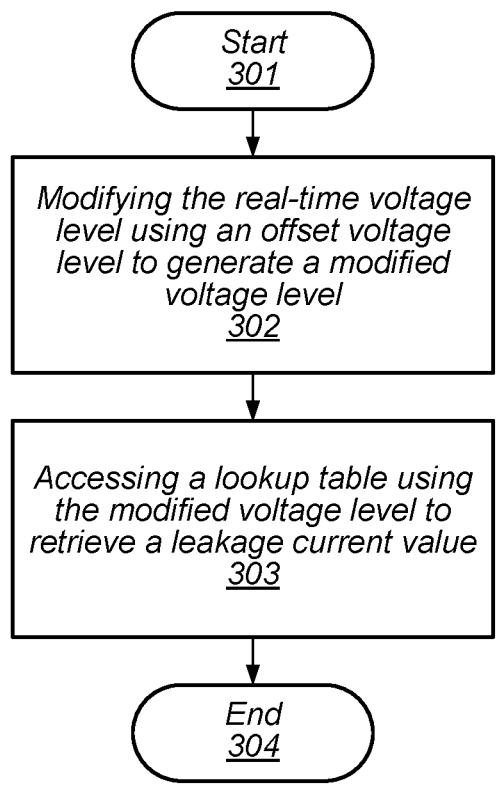
FIG. 3 illustrates a flow diagram depicting an embodiment of a method for determining a leakage current value for a circuit block in a computer system.

It is noted that the embodiment of the method illustrated in FIG. 3 is merely an example. In other embodiments, different operations and different orders of operations may be employed.

Figure 4:
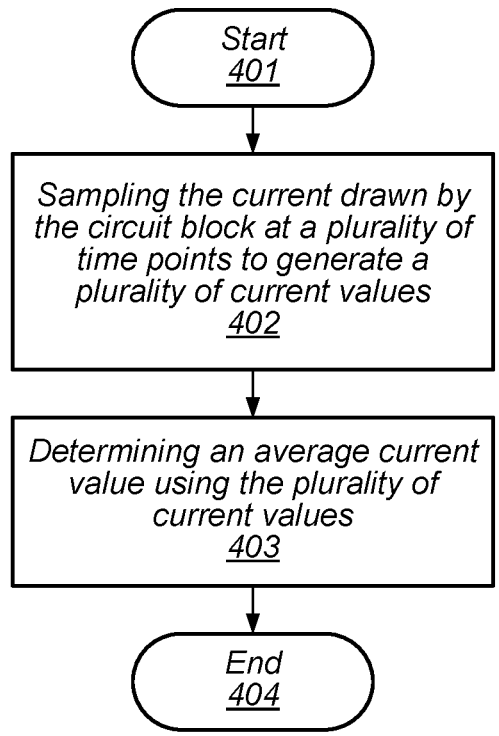
FIG. 4 illustrates a flow diagram depicting an embodiment of a method for determining an average current value.

Turning to FIG. 4, an embodiment of a method for determining an average current value is depicted in the illustrated flow diagram. In various embodiments, the method of FIG. 4 may be included in the operation described in block 201 of the method illustrated in the flow diagram of FIG. 2. The method begins in block 401.

The current consumed by the circuit block may then be sampled, by a power control circuit, at a plurality of time points to generate a plurality of current values (block 402). In various embodiments, at a particular one of the plurality of time points, the current consumed by the circuit block may be determined by measuring a voltage drop across a particular resistance value, or any other suitable means. Once a particular current value of the plurality of current values has been determined, it may be stored in a register file, memory, or other suitable storage location.

The power control circuit may then determine an average current value using the plurality of current values (block 403). In various embodiments, the average may be calculated as a running average, or after a predetermined number of current values have been sampled. Once the average current value has been determined, the method may end in block 404.

It is noted that the embodiment of the method illustrated in the flow diagram of FIG. 4 is merely an example. In other embodiments, different operations and different orders of operation are possible and contemplated.

In some computer system, different circuit blocks may employ different power supply voltage levels, and the power management circuit may generate the different power supply voltage levels. Circuit blocks that operate using a common power supply voltage level may be included in a common power domain. As used and described herein, a power domain is a set of circuit blocks of a computer system that operate using a common power supply signal.

Figure 5:
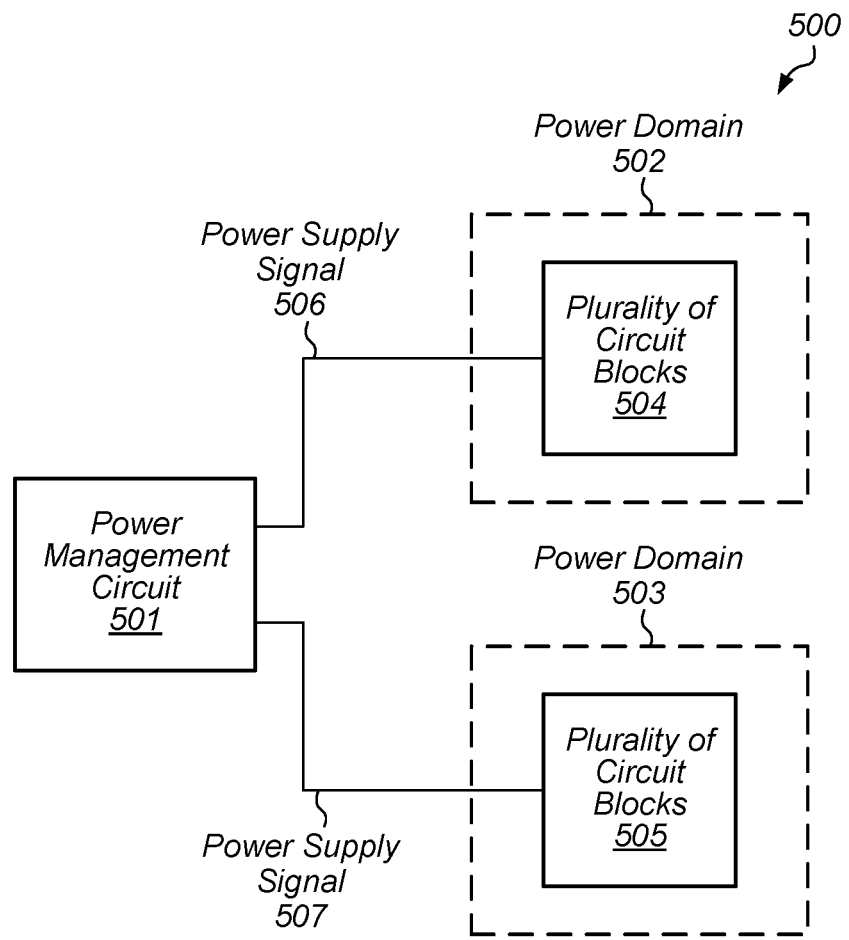
FIG. 5 is a block diagram of an embodiment of a computer system including multiple power domains.

Turning to FIG. 5, an embodiment of a computer system that includes multiple power domains is illustrated. In the present embodiment, SoC 500 includes power management circuit 501, power domain 502, and power domain 503. Power domain 502 includes the plurality of circuit blocks 504 coupled to power supply signal 506, and power domain 503 includes the plurality of circuit blocks 505 coupled to power supply signal 506.

During operation, power management circuit 501 may generate regulated voltage levels on power supply signal 506 and power supply signal 507. At predetermined times (commonly referred to as "heart beats"), power management circuit 501 may be configured to measure a first current consumed by the plurality of circuit blocks 504, and measure a second current consumed by the plurality of circuit blocks 505.

Power management circuit 501 may be further configured to, using the first current and a zero load voltage level of power supply signal 506, determine a first real time voltage level of power supply signal 506. Additionally, power management circuit 501 may be configured to, using the second current and a zero load voltage level of power supply signal 507, determine a second real time voltage level of power supply signal 507. In some embodiments, power management circuit 501 may determine the first and second real time voltage levels in a fashion similar to operation of power control circuit 102 as described above in regard to FIG. 1.

Using the first current and the first real time voltage level, power management circuit 501 may be configured to determine a first power consumption of power domain 502. Power management circuit 501 may be further configured to determine a second power consumption of power domain 503 using the second current and the second real time voltage level. In various embodiments, power management circuit 501 may also be configured to receive data from one or more temperature sensors included in the computer system, and used such data in determination of the power consumption values. Additionally, in cases where a particular power domain includes one or more processors or processor cores, power management circuit 501 may be further configured to base the power consumption on a number of cycles a particular processor or processor core skips over a particular period of time.

Power management circuit 501 may also be configured to determine an overall power consumption using the first power consumption of power domain 502 and the second power consumption of power domain 503. Using the overall power consumption, power management circuit 501 may adjust one or more operation parameters of the computer system. By determining the overall power consumption of the individual power domains using real time voltage levels of the power supply signal, power management circuit 501 may more accurately determine the overall power consumption and adjust the power state of the computer system for optimal performance.

Power management circuit 501 may, in various embodiments, include voltage regulator circuits, control circuits, and memory circuits or lookup table circuits for used in determining the power consumption of the circuit blocks include in power domain 503 and power domain 503. The voltage regulator circuits may be configured to generate regulated voltage levels on power supply signals 506 and 507, and may include one or more passive circuit elements such as inductors, for example.

Control circuits included in power management circuit 501 may be particular embodiments of sequential logic circuits or state machines configured to perform the operations described above. Such sequential logic circuits or state machines may include a combination of static logic gates, latch circuits, and flip-flop circuits. In some embodiments, the control circuits may include a general-purpose processor circuit configured to execute software or program instructions.

The plurality of circuit blocks 504 and the plurality of circuit blocks 505 may include any suitable combination of circuit blocks. For example, the plurality of circuit blocks 504 may include multiple processors or processor cores that form a processor complex. Alternatively, or additionally, the plurality of circuit blocks 505 may include multiple memory circuits, such as, e.g., static random-access memory circuits, that form a multiple bank cache memory, or other suitable memory structure. It is noted that although only two power domains are included in the embodiment illustrated in FIG. 5, in other embodiments, and suitable number of power domains may be included in SoC 500.

It is noted that the embodiment depicted in FIG. 5 is merely an example. In other embodiments, different number of power domains, and different numbers of circuits blocks within a given power domain are possible and contemplated.

Figure 6:
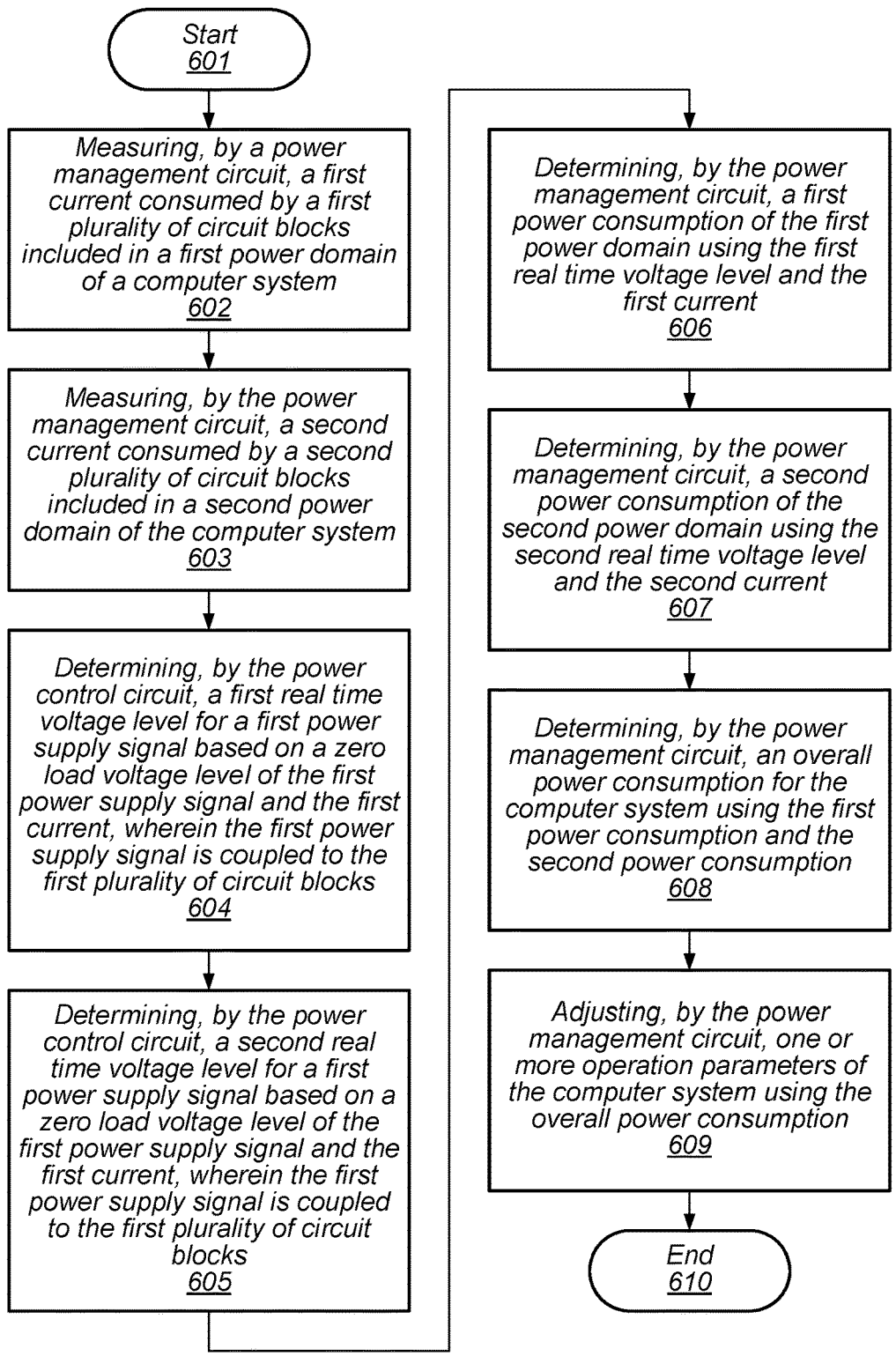
FIG. 6 illustrates a flow diagram depicting an embodiment of a method for determining power consumption in a computer system that includes multiple power domains.

Turning to FIG. 6, a flow diagram depicting an embodiment of a method for determining power consumption in a computer system that includes multiple power domains is illustrated. The method begins in block 601.

A power management circuit, such as, e.g., power management circuit 501 as depicted in FIG. 5, may measure a first current consumed by a first plurality of circuit blocks included in a first power domain of a computer system (block 602). In various embodiments, the first current may be determined by calculating a running average of current being consumed by the first plurality of circuit blocks over a particular period of time.

The power management circuit may also measure a second current consumed by a second plurality of circuit blocks included in a second power domain of the computer system (block 603). It is noted that although two power domains are included in the method of FIG. 6, in other embodiments, any suitable number of power domains and associated circuits may be employed.

A first real time voltage level for a first power supply signal coupled to the first plurality of circuit blocks may be determined by the power management circuit using a zero load voltage level for the first power supply signal and the first current (block 604). A second real time voltage level for a second power supply signal coupled to the second plurality of circuit blocks may be determined by the power management circuit using a zero load voltage level for the second power supply signal and the second current (block 605). In various embodiments, the first and second real time voltage levels may be determined in a fashion similar to that described above in regard to FIG. 1 and FIG. 2.

The power management circuit may then determine a first power consumption of the first power domain using the first real time voltage level and the first current (block 606), and a second power consumption for the second power domain using the second real time voltage level and the second current (block 607). In various embodiments, the first real time voltage level and the first current may be combined in any suitable fashion to determine the first power consumption. For example, to generate the first power consumption, the power management circuit may multiply the first real time voltage level and the first current. The second real time voltage level and the second current may be combined in a similar fashion to generate the second power consumption.

It is noted that in cases where a particular power domain includes one or more processors or processor cores, the determination of the power consumption of the particular power domain may also be based on a number of cycles that particular processors or processor cores skip during operation in order to modify power consumption.

An overall power consumption may then be determined by the power management circuit using the first power consumption and the second power consumption (block 608). In various embodiments, the power management circuit may add the first power consumption and the second power consumption to determine the overall power consumption. It is noted that in some embodiments, either the first power consumption, or the second power consumption may be scaled prior to determining the overall power consumption.

The power management circuit may then adjust one or more operation parameters of the computer system using the overall power consumption (block 609). In various embodiments, by adjusting the one or more operation parameters of the computer system, the power management system may optimize the performance of the computer system with accurate power consumption values. Such operation parameters may include, without limitation, a target frequency and voltage level for a circuit, a number of cycles a processor or processor core should skip over a given number of cycles, and the like. The method may conclude in block 610.

It is noted that the embodiment of the method depicted in the flow diagram of FIG. 6 is merely an example. In other embodiments, different operations and different orders of operations are possible and contemplated.

Figure 7:
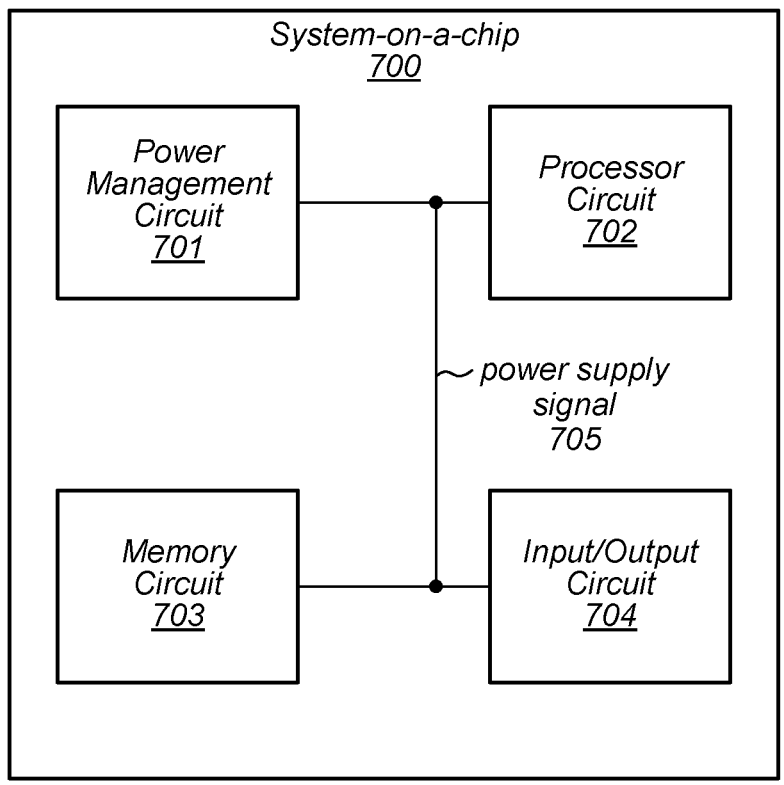
FIG. 7 is a block diagram of one embodiment of a system-in-a-chip.

A block diagram of a system-on-a-chip (SoC) is illustrated in FIG. 7. In the illustrated embodiment, the SoC 700 includes power management circuit 701, processor circuit 702, input/output circuit 704, and memory circuit 703. In various embodiments, SoC 700 may be configured for use in a desktop computer, server, or in a mobile computing application such as, e.g., a tablet, laptop computer, or wearable computing device, and may correspond to computer system 100 as illustrated in FIG. 1, or computer system 500 as illustrated in FIG. 5.

Power management circuit 701 may be configured to generate a regulated voltage level on internal power supply 705 in order to provide power to processor circuit 702, input/output circuit 704, and memory circuit 703. In various embodiments, power management circuit 701 may include one or more voltage regulator circuits, such as, e.g., voltage regulator circuit 101 configured to generate the regulated voltage level based on an external power supply (not shown). Additionally, power management circuit 701 may include control circuits, such as, e.g., power control circuit 102, configured to adjust or control the operation of the aforementioned voltage regulator circuit. It is noted that although a single internal power supply and a single power domain is depicted in the embodiment of FIG. 7, in other embodiments any suitable number of internal power supplies and power domains may be employed.

Processor circuit 702 may, in various embodiments, be representative of a general-purpose processor that performs computational operations. In various embodiments, processor circuit 702 may correspond to circuit block 104 as depicted in FIG. 1. For example, processor circuit 702 may be a central processing unit (CPU) such as a microprocessor, a microcontroller, an application-specific integrated circuit (ASIC), or a field-programmable gate array (FPGA), or other suitable processing circuit.

Memory circuit 703 may correspond to circuit block 104 as illustrated in FIG. 1, In various embodiments, memory circuit 703 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of a system-on-a-chip illustrated in FIG. 7, a single memory circuit is depicted. In other embodiments, any suitable number of memory circuits may be employed.

Input/output circuit 704 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuit 704 may be configured to implement a version of Universal Serial Bus (USB) protocol or IEEE 1394 (Firewire®) protocol.

Input/output circuit 704 may also be configured to coordinate data transfer between SoC 700 and other computing systems or integrated circuits coupled to SoC 500 via a network. In one embodiment, input/output circuit 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuit 704 may be configured to implement multiple discrete network interface ports.

It is noted that the embodiment of a computer system depicted in FIG. 7 is merely an example. In other embodiments, different numbers of circuit blocks, and along with different arrangements of circuit blocks may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:
1. An apparatus, comprising:
a first circuit coupled to a first power supply node;
a second circuit coupled to a second power supply node; and
a control circuit configured to:
sample a first current consumed by the first circuit at a plurality of time points to generate a corresponding plurality of first current values;
sample a second current consumed by the second circuit at the plurality of time points to generate a corresponding plurality of second current values;
determine a first power consumption using the corresponding plurality of first current values and a voltage level of the first power supply node;
determine a second power consumption using the corresponding plurality of second current values and a voltage level of the second power supply node;
determine an overall power consumption using the first power consumption and the second power consumption; and adjust, using the overall power consumption, respective operation parameters of the first circuit and the second circuit.

2. The apparatus of claim 1, wherein the control circuit is further configured to:
   determine the voltage level of the first power supply node using the first current, a first load line slope value, and a zero-load voltage level of the first power supply node; and
   determine the voltage level of the second power supply node using the second current, a second load line slope value, and a zero-load voltage level of the second power supply node.

3. The apparatus of claim 2, wherein to determine the voltage level of the first power supply node, the control circuit is further configured to modify the voltage level of the first power supply node using a first offset voltage to generate a first modified voltage level, and wherein to determine the voltage level of the second power supply node, the control circuit is further configured to modify the voltage level of the second power supply node using a second offset voltage to generate a second modified voltage level.

4. The apparatus of claim 3, wherein the control circuit is further configured to:
   access a lookup table using the first modified voltage level to retrieve a first leakage current associated with the first circuit; and
   access the lookup table using the second modified voltage level to retrieve a second leakage current associated with the second circuit.

5. The apparatus of claim 4, wherein the control circuit is further configured to:
   determine the first power consumption using the first current, the voltage level of the first power supply node, and the first leakage current; and
   determine the second power consumption using the second current, the voltage level of the second power supply node, and the second leakage current.

6. A method, comprising:
   sampling, by a power management circuit, a first current consumed by a first circuit included in a first power domain of a computer system at a plurality of time points to generate a corresponding plurality of first current values;
   sampling, by the power management circuit, a second current consumed by a second circuit included in a second power domain of the computer system at the plurality of time points to generate a corresponding plurality of second current values;
   determining, by the power management circuit, a first power consumption using the corresponding plurality of first current values and a voltage level of a first power supply node coupled to the first circuit;
   determining, by the power management circuit, a second power consumption using the corresponding plurality of second current values and a voltage level of a second power supply node coupled to the second circuit;
   determining, by the power management circuit, an overall power consumption using the first power consumption and the second power consumption; and
   adjusting, by the power management circuit, one or more operation parameters of the computer system using the overall power consumption.

7. The method of claim 6, further comprising:
   determining the voltage level of the first power supply node using the first current, a first load line slope value, and a zero-load voltage level of the first power supply node; and
   determining the voltage level of the second power supply node using the second current, a second load line slope value, and a zero-load voltage level of the second power supply node.

8. The method of claim 7, wherein determining the voltage level of the first power supply node includes modifying the voltage level of the first power supply node using a first offset voltage to generate a first modified voltage level, and wherein determining the voltage level of the second power supply node includes modifying the voltage level of the second power supply node using a second offset voltage to generate a second modified voltage level.

9. The method of claim 8, further comprising:
   accessing a lookup table using the first modified voltage level to retrieve a first leakage current associated with the first circuit; and
   accessing the lookup table using the second modified voltage level to retrieve a second leakage current associated with the second circuit.

10. The method of claim 9, further comprising:
    determining the first power consumption using the first current, the voltage level of the first power supply node, and the first leakage current; and
    determining the second power consumption using the second current, the voltage level of the second power supply node, and the second leakage current.

11. The method of claim 6, further comprising:
    averaging the corresponding plurality of first current values to generate the first current; and
    averaging the corresponding plurality of second current values to generate the second current.

12. A system, comprising:
    a plurality of circuits including a first circuit coupled to a first power supply node and a second circuit coupled to a second power supply node; and
    a power management circuit configured to:
       sample a first current flowing in the first power supply node at a plurality of time points to generate a corresponding plurality of first samples;
       sample a second current flowing in the second power supply node at the plurality of time points to generate a corresponding plurality of second samples;
       determine a first power consumption using the corresponding plurality of first samples and a voltage level of the first power supply node;
       determine a second power consumption using the corresponding plurality of second samples and a voltage level of the second power supply node;
       determine an overall power consumption using the first power consumption and the second power consumption; and
       adjust one or more operation parameters of the plurality of circuits using the overall power consumption.

13. The system of claim 12, wherein the power management circuit is further configured to:
    average the corresponding plurality of first samples to generate a first supply current; and
    average the corresponding plurality of second samples to generate a second supply current.

14. The system of claim 13, wherein the power management circuit is further configured to:
- determine the voltage level of the first power supply node using the first supply current, a first load line slope value, and a zero-load voltage level of the first power supply node; and
- determine the voltage level of the second power supply node using the second supply current, a second load line slope value, and a zero-load voltage level of the second power supply node.

15. The system of claim 14, wherein the power management circuit is further configured to:
- modify the voltage level of the first power supply node using a first offset voltage to generate a first modified voltage level; and
- modify the voltage level of the second power supply node using a second offset voltage to generate a second modified voltage level.

16. The system of claim 15, wherein the power management circuit is further configured to:
- access a lookup table using the first modified voltage level to retrieve a first leakage current value associated with the first circuit; and
- access the lookup table using the second modified voltage level to retrieve a second leakage current value associated with the second circuit.

17. The system of claim 16, wherein the power management circuit is further configured to:
- determine the first power consumption using the first supply current, the voltage level of the first power supply node, and the first leakage current value; and
- determine the second power consumption using the second supply current, the voltage level of the second power supply node, and the second leakage current value.

* * * * *